US005680909A

United States Patent [19]
Lofy

[11] Patent Number: 5,680,909
[45] Date of Patent: Oct. 28, 1997

[54] CRUSH SENSOR FOR USE IN A VEHICLE

[75] Inventor: John D. Lofy, Monrovia, Calif.

[73] Assignee: TRW Technar Inc., Irwindale, Calif.

[21] Appl. No.: 467,765

[22] Filed: Jun. 6, 1995

[51] Int. Cl.⁶ .................... B60K 28/10; B60R 21/32
[52] U.S. Cl. .............. 180/274; 200/61.44; 280/734; 280/735
[58] Field of Search ................. 280/735, 734; 180/274, 271; 200/61.41, 61.42, 61.43, 61.44, 61.73, 85 R, 511, 512

[56] References Cited

U.S. PATENT DOCUMENTS

| | | | |
|---|---|---|---|
| 4,995,639 | 2/1991 | Breed | 180/274 |
| 5,023,418 | 6/1991 | Beckhausen | 200/511 |
| 5,307,896 | 5/1994 | Taguchi et al. | 280/735 |
| 5,335,749 | 8/1994 | Taguchi et al. | 180/274 |

FOREIGN PATENT DOCUMENTS

| | | | |
|---|---|---|---|
| 1273397 | 9/1961 | France | 180/274 |
| 2671525 | 7/1992 | France | 280/735 |
| 2643505 | 3/1978 | Germany | 200/61.43 |
| 93/01071 | 1/1993 | WIPO | 280/735 |

OTHER PUBLICATIONS 1991 advertisement of Automotive Technologies International, Inc. entitled "Crush Switch Air Bag Crash Sensor".

SAE Technical Paper No. 920122 entitled "Crush Sensor For Use With Automotive Air Bag Systems", Feb. 24–28, 1992.

Primary Examiner—Eric D. Culbreth
Attorney, Agent, or Firm—Tarolli, Sundheim, Covell, Tummino & Szabo

[57] ABSTRACT

A crush sensor (10) includes a deformable first elongated member (20) having a width (W) and a length (L). A deformable second elongated member (30) has a width (W) and a length (L). The first and second members are parallel to each other and are closely spaced from one another. The first member includes an elongated contact surface (22) extending along its length. The second member includes an elongated contact surface (32) extending along its length and facing towards the elongated contact surface of the first member. The contact surface of at least one of the members includes a generally planar strip (34) and a raised electrically conductive rib (36) extending along its length and protruding from the strip toward the contact surface of the other member. The contact surfaces are normally electrically isolated from one another when the members are closely spaced from one another. The contact surfaces move into electrical contact with each other upon deformation of at least one of the first and second members.

13 Claims, 3 Drawing Sheets

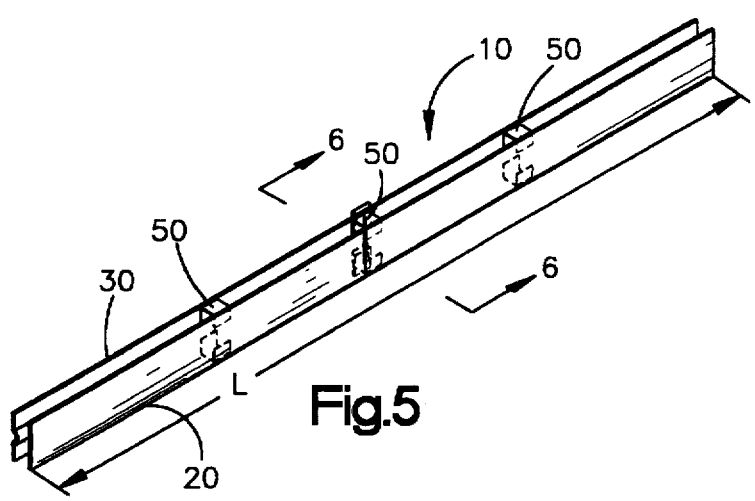
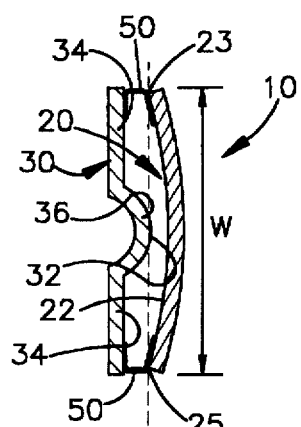
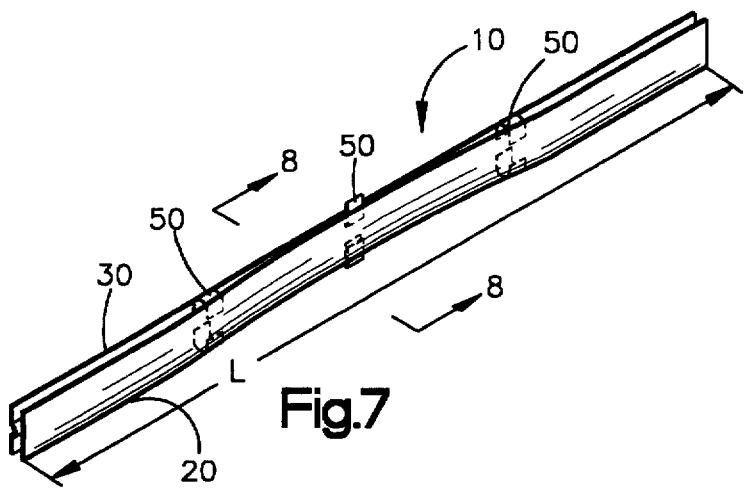
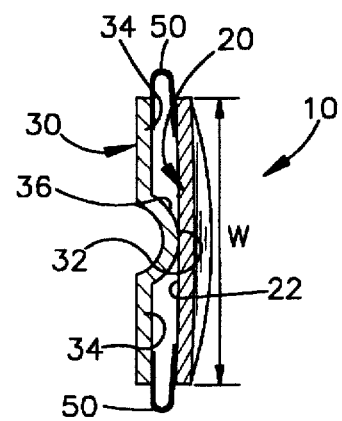
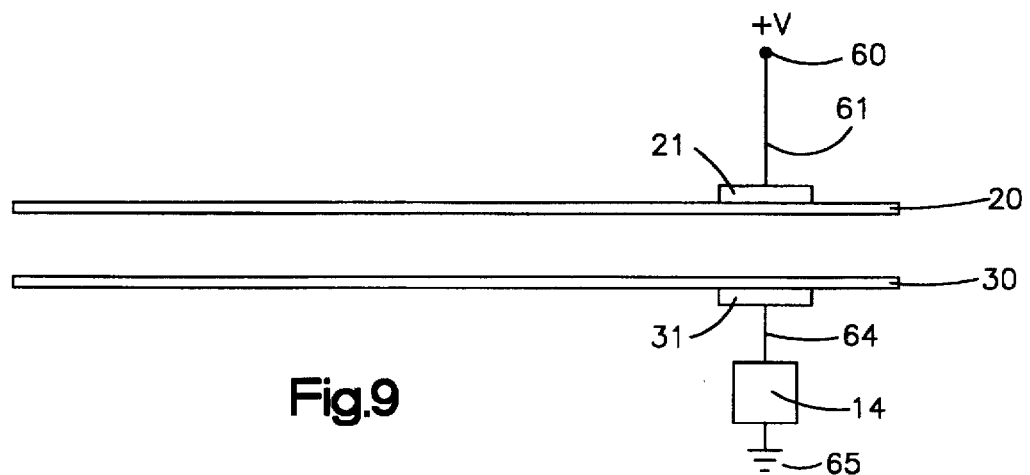

CRUSH SENSOR FOR USE IN A VEHICLE

BACKGROUND OF THE INVENTION

1. Technical Field

The present invention relates to a vehicle crush sensor, and is particularly directed to a crush sensor mounted on a vehicle door and responsive to crushing of the vehicle door upon a side impact against the vehicle door.

2. Description of the Prior Art

A known crush sensor for use in a vehicle is disclosed in U.S. Pat. No. 4,995,639. One embodiment of the crush sensor disclosed in U.S. Pat. No. 4,995,639 includes a contact and a dome spaced apart from the contact. The dome inverts and touches the contact to complete an electrical circuit when the dome is struck with sufficient force in response to a vehicle crash. A disadvantage of the crush sensor disclosed in U.S. Pat. No. 4,995,639 is that the crush sensor is not sensitive over a relatively wide range of crush areas on the vehicle. This is because the surface area of the dome of the crush sensor is relatively small and does not extend over a relatively wide range of crush areas on the vehicle.

SUMMARY OF THE INVENTION

In accordance with one aspect of the present invention, a crush sensor is mountable on a vehicle door having a length extending along the forward and rearward directions of travel of the vehicle. The crush sensor comprises deformable first and second elongated members parallel to each other and closely spaced from one another. Each of the members has an elongated contact surface which faces the elongated contact surface of the other member. The contact surface of at least one of the members includes a generally planar strip having a raised electrically conductive rib extending along its length and protruding from the strip toward the elongated contact surface of the other member. The contact surfaces are normally electrically isolated from one another when the members are closely spaced from one another. The contact surfaces move into electrical contact with each other upon deformation of at least one of the first and second members.

Preferably, the contact surface of one of the members has a concave surface area, and the contact surface of the other one of the members has a convex surface area which faces the concave surface area of the contact surface of the one member. The length of each of the elongated members is more than 50 percent of the length of the vehicle door in which the sensor is to be mounted. Preferably, the length of each of the elongated members is about 85 percent of the length of the vehicle door. Greater sensitivity is provided when the length of each of the elongated members is increased.

When a side impact against the vehicle door occurs, at least one of the first and second elongated members deforms. Preferably, the elongated member having the concave surface area deforms in such manner that the elongated member buckles laterally. When this occurs, the concave surface area of the elongated member moves into reliable electrical contact with the convex surface area of the other elongated member. Thus, reliable electrical contact is established between the elongated members when the elongated member having the concave surface area deforms in response to a side impact against the vehicle door.

BRIEF DESCRIPTION OF THE DRAWINGS

Further features of the present invention will become apparent to those skilled in the art to which the present invention relates from reading the following specification with reference to the accompanying drawings, in which:

FIG. 5 is a view of the crush sensor of FIG. 3 but with certain parts removed;

FIG. 6 is a sectional view taken approximately along line 6—6 in FIG. 5;

FIG. 7 is a view similar to FIG. 5 but showing the crush sensor in a deformed condition;

FIG. 8 is a sectional view taken approximately along line 8—8 in FIG. 7; and

FIG. 9 is a schematic diagram of an electrical circuit embodying a crush sensor constructed in accordance with the present invention.

DESCRIPTION OF THE PREFERRED EMBODIMENT

Figures 1, 2:
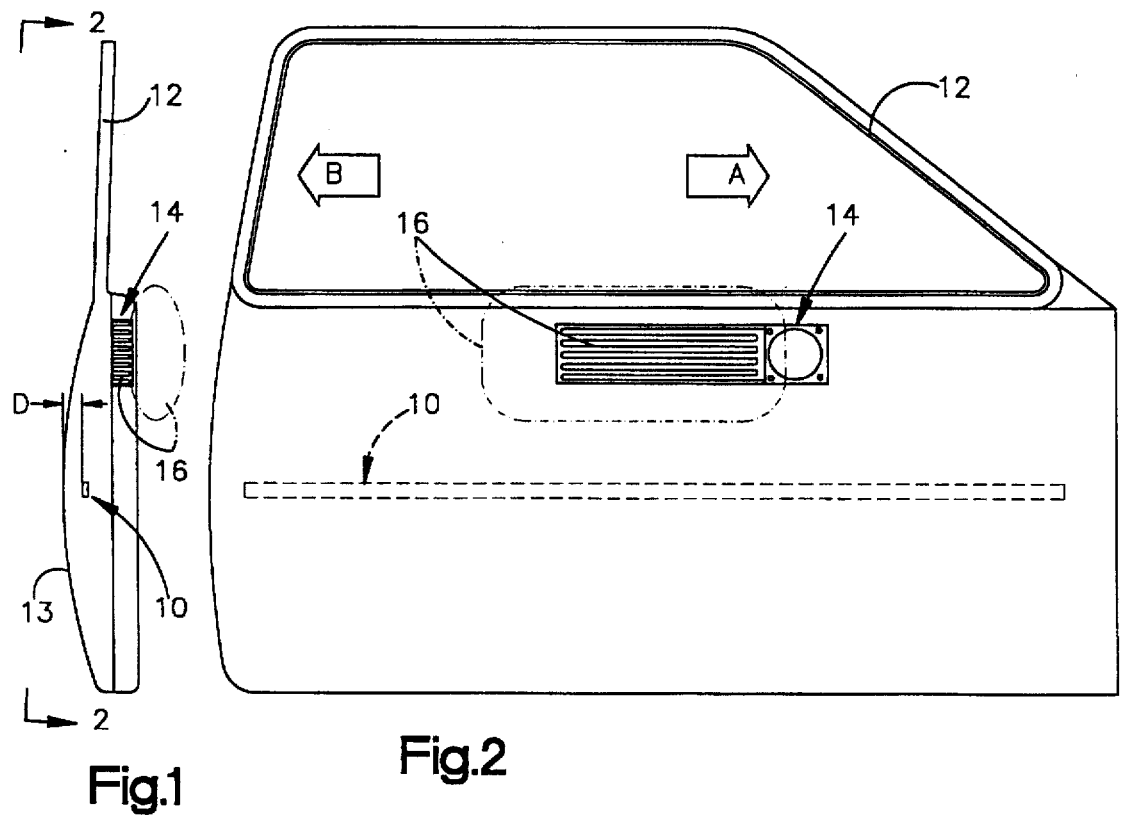
FIG. 1 is a schematic view of a vehicle door embodying a crush sensor constructed in accordance with the present invention.
FIG. 2 is a view in the direction of line 2—2 in FIG. 1 and showing parts of the vehicle door removed.

The present invention is directed to a crush sensor for use in a vehicle. The specific construction of the crush sensor may vary. As representative of the present invention, a crush sensor 10 is mounted on a vehicle door 12 having an outer skin 13 as shown in FIGS. 1 and 2. The crush sensor 10 is spaced apart from the outer skin 13 of the vehicle door 12 by a distance D. The crush sensor 10 is mounted on the vehicle door 12 in a generally horizontal orientation, i.e., along the forward direction of travel (shown with arrow A) and the rearward direction of travel (shown with arrow B) of the vehicle.

An air bag assembly 14 including an inflatable air bag 16 is also mounted on the vehicle door 12. The air bag 16 is stored in a tightly folded condition (illustrated in solid lines in FIGS. 1 and 2) and, upon the occurrence of a side impact of sufficient severity, is rapidly inflated to a deployed condition (illustrated in dashed lines in FIGS. 1 and 2) to protect a vehicle occupant from violently striking parts of the vehicle door 12 as a result of the side impact. Although the air bag assembly 14 is described herein as being mounted on the vehicle door 12, it is contemplated that the air bag assembly may be located in a vehicle seat, a B-pillar of the vehicle, or at another suitable location in the vehicle.

An actuatable inflator (not shown) contains a source of gas, such as a pyrotechnic gas generating material or a quantity of stored gas or a combination of stored gas and gas generating material. When actuated, the inflator provides gas which is directed into the interior of the air bag 16 to inflate the air bag 16. The inflator actuates to inflate the air bag 16 to protect a vehicle occupant when the crush sensor 10 is deformed in response to the vehicle door 12 being deformed in an impact against the vehicle door 12.

Figure 3:
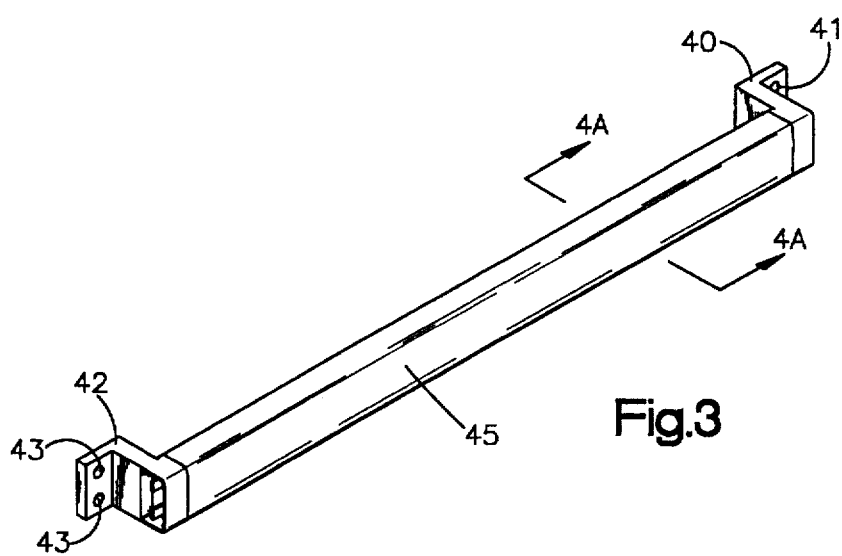
FIG. 3 is an enlarged perspective view of the crush sensor of FIGS. 1 and 2.
Figure 4A:
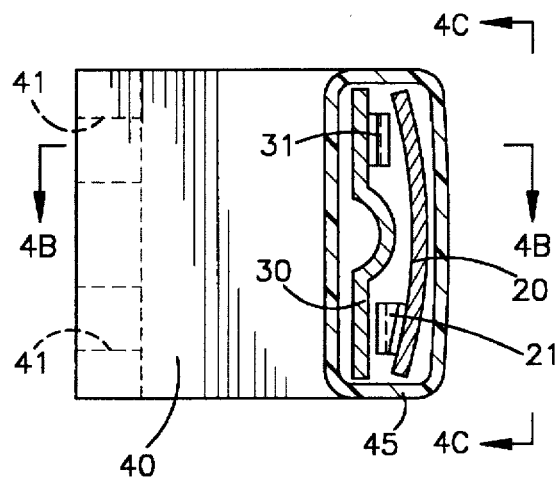
FIG. 4A is a sectional view taken approximately along line 4A—4A in FIG. 3.

Referring to FIG. 3 and 4A–4C, the crush sensor 10 comprises an elongated plastic sleeve 45 which is supportingly mounted at its ends between a pair of mounting brackets 40, 42. Preferably, the plastic sleeve 45 is extruded with a cross sectional shape as best illustrated in FIG. 4A. The mounting brackets 40, 42 are preferably made of a high strength plastic material. The mounting bracket 40 has a pair of mounting holes 41 (best illustrated in FIG. 4C) which allow the crush sensor 10 to be mounted on the vehicle door 12 using suitable nuts and bolts. Similarly, the other mounting bracket 42 has a pair of mounting holes 43 (best illustrated in FIG. 3) which allow the crush sensor 10 to be mounted on the vehicle door 12 using suitable nuts and bolts.

Referring to FIG. 5, the direction of looking at the crush sensor 10 is the same as in FIG. 3. The difference between FIG. 3 and FIG. 5 is that certain parts including the plastic sleeve 45 and the pair of mounting brackets 40, 42 are removed from FIG. 5 so that the specific construction of the crush sensor 10 is better visualized. The crush sensor 10 is shown in a normal condition in FIG. 5.

Referring to FIGS. 4A–4C, 5, 6, the crush sensor 10 comprises a first elongated metallic member 20 having a width W and a length L. The first member 20 is located toward an outboard side of the sensor 10 and the outer skin 13 of the vehicle door 12. The first member 20 includes an elongated contact surface 22 (FIG. 6) along its length L. The contact surface 22 is concave-shaped as best shown in FIG. 6. The crush sensor 10 further comprises a second elongated metallic member 30 having a width which is the same as the width W of the first member 20 and a length which is the same as the length L of the first member 20. The second member 30 is located toward an inboard side of the sensor 10 and the vehicle door 12. The first member 20 is located between the outer skin 13 of the vehicle door 12 and the second member 30.

The first and second members 20, 30 are disposed inside the plastic sleeve 45 and are supportingly mounted between the pair of mounting brackets 40, 42. Specifically, one end of each of the first and second members 20, 30 is inserted into the mounting bracket 40 as shown in FIG. 4B. The opposite end of each of the first and second members 20, 30 is inserted into the other mounting bracket 42 in the same manner. The plastic sleeve 45 prevents foreign objects from accidently shorting out the first and second members 20, 30. The plastic sleeve 45 also functions as an environmental barrier.

Preferably, each of the first and second members 20, 30 is made of an electrically conductive metallic material such as plated low carbon steel. The length L of the first and second members 20, 30 is more than 50 percent of the length of the vehicle door 12, as measured in the forward and rearward directions of travel of the vehicle. Preferably, the length L of the first and second members 20, 30 is about 85 percent of the length of the vehicle door 12. Greater sensitivity is provided when the length L of the first and second members 20, 30 is increased.

The second member 30 is closely spaced from, and parallel to, the first member 20. Moreover, the second member 30 includes an elongated contact surface 32 (FIG. 6) along its length L. The contact surface 32 includes a narrow, generally planar strip 34 and a longitudinal raised rib 36 which projects from the strip 34 and faces the contact surface 22 along the length L of the first and second members 20, 30. Therefore, the contact surface 32 of the second member 30 (more specifically, rib 36) has a convex cross sectional shape which faces the concave-shaped contact surface 22 of the first member 20. The concave-shaped contact surface 22 of the first member 20 has opposite outer edges 23, 25 which lie in a flat plane 27 extending through the rib 36 of the contact surface 32 of the second member 30.

Suitable insulated spacers 50 are located between the first and second members 20, 30 along the length L of the first and second members 20, 30. The spacers 50 may be made of, for example, a plastic material or an elastomeric material. The spacers 50 electrically isolate the contact surface 22 of the first member 20 from the contact surface 32 of the second member 30. Alternatively, a suitable insulator may be disposed along at least a portion of the length L of the first and second members 20, 30 between the contact surfaces 22, 32 to electrically isolate the contact surfaces 22, 32 from each other.

Figure 4C:
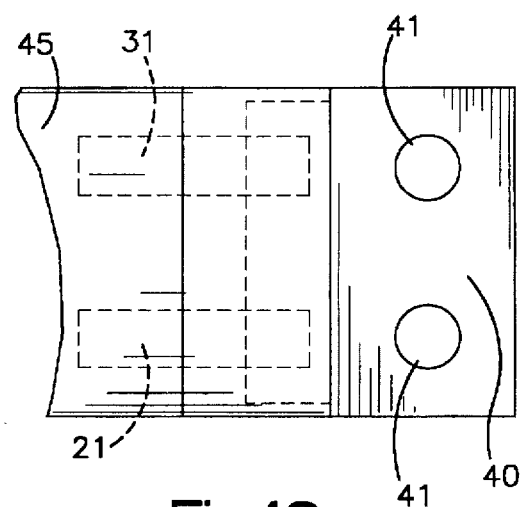
FIG. 4C is a view taken along line 4C—4C in FIG. 4A.
Figure 4B:
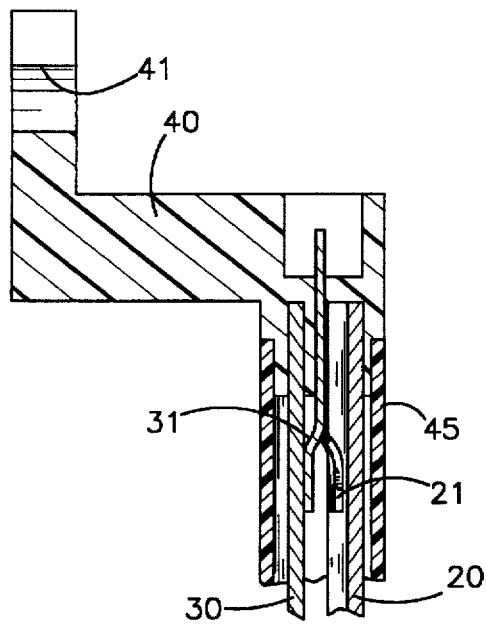
FIG. 4B is a sectional view taken approximately along line 4B—4B in FIG. 4A.

As shown in FIGS. 4A–4C, a first connector strip 21 extends through the mounting bracket 40 (best shown in FIG. 4B). The first connector strip 21 has opposite ends. One end of the first connector strip 21 is curved towards the first member 20 and electrically contacts the first member 20. The other end of the first connector strip 21 is straight and is connectable to an electrical wire 61 (as schematically shown in FIG. 9) connected to the positive terminal 60 of the vehicle battery.

A second connector strip 31 located adjacent to the first connector strip 21 also extends through the mounting bracket 40. The second connector strip 31 has opposite ends and is similar in construction to the first connector strip 21. One end of the second connector strip 31 is curved towards the second member 30 (best shown in FIG. 4B) and electrically contacts the second member 30. The other end of the second connector strip 31 is straight and is connectable to an electrical wire 64 (as schematically shown in FIG. 9) connected to the air bag assembly 14 which, in turn, is connected to the negative terminal 65 of the vehicle battery.

When the vehicle door 12 is crushed in an impact against the vehicle door 12, the crush sensor 10 deforms from the normal condition shown in FIG. 5 to a deformed condition shown in FIG. 7. As the crush sensor 10 deforms from the normal condition shown in FIG. 5 to the deformed condition shown in FIG. 7, the first and second members 20, 30 move toward each other from their positions shown in FIG. 6 to the positions shown in FIG. 8. As the first and second members 20, 30 move toward each other, the insulated spacers 50 are crushed or deformed.

After the spacers 50 are crushed, as best shown in FIG. 8, the first member 20 deforms in such manner that it buckles laterally. When the first member 20 buckles laterally, a surface portion on the contact surface 22 of the first member 20 moves into engagement with the rib 36 on the second member 30 abruptly to establish an electrical connection between the first and second members 20, 30. The abrupt movement of the surface portion of the contact surface 22 into engagement with the rib 36 on the second member 30 results in a prolonged contact closure time between the first and second members 20, 30. Although the electrical connection between the first and second members 20, 30 is established upon buckling of the first member 20, it is conceivable that the electrical connection could be established upon only simple deformation of the first member 20.

With reference to the schematic illustration of FIG. 9, the electrical connection between the first and second members 20, 30 is established such that current flows from the positive terminal 60 of the vehicle battery through the first and second members 20, 30 of the crush sensor 10 to the air bag assembly 14. In response to the electrical connection being established between the first and second members 20, 30, an inflator (not shown) located in the air bag assembly 14 is actuated to inflate the air bag 16 to protect the vehicle occupant. Thus, the air bag 16 is inflated to protect the vehicle occupant upon the vehicle door 12 being crushed in an impact against the vehicle door 12.

It will be apparent that the distance D between the crush sensor 10 and the outer skin 13 of the vehicle door 12 should be as short as possible. However, it is desirable that the distance D be not so short that false triggering of the crush sensor 10 occurs.

A number of advantages result by using a crush sensor constructed in accordance with the present invention. One advantage is that the crush sensor 10 is sensitive over a relatively wide range of crush areas on the vehicle door 12. This advantage is obtained because the contact surfaces 22, 32 of the first and second members 20, 30 is along more than 50 percent of the length of the vehicle door 12 in the forward and rearward directions of travel of the vehicle.

Another advantage in using the crush sensor 10 constructed in accordance with the present invention is that the insulated spacers 50 prevent the contact surface 22 of the first member 20 from electrically connecting with the contact surface 32 of the second member 30 when the vehicle door 12 is subjected to typical, normal vibrations during operation of the vehicle.

Still another advantage is that the buckling action of the concave-shaped contact surface 22 of the first member 20 during deformation of the crush sensor 10 provides a bounce-free electrical contact with prolonged contact closure time between the first and second members 20, 30.

It is contemplated that the crush sensor 10 may be used in conjunction with a safing sensor to actuate an inflator which releases gas to inflate an air bag. It is also contemplated that the crush sensor 10 itself may be used as a safing sensor.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. A crush sensor for mounting on a vehicle door having a length for extending along forward and rearward directions of travel of the vehicle, said crush sensor comprising:

deformable first and second elongated members parallel to each other and closely spaced from one another; and each of said members having an elongated contact surface which faces an elongated contact surface of the other member, the contact surface of at least one of said members including a generally planar strip having a raised electrically conductive rib extending along its length and protruding from said strip toward the elongated contact surface of the other member, said contact surfaces being normally electrically isolated from one another when said members are closely spaced from one another, said contact surfaces moving into electrical contact with each other upon deformation of at least one of said first and second members;

said contact surface of one of said members having a concave surface area, and said raised electrically conductive rib of the other one of said members having a convex surface area which faces said concave surface area of said contact surface of said one member;

said concave surface area having opposite outer edge portions which lie in a flat plane extending through said raised electrically conductive rib.

2. A crush sensor for mounting on a vehicle door having a length for extending along forward and rearward directions of travel of the vehicle, said crush sensor comprising:

deformable first and second elongated members parallel to each other and closely spaced from one another; and each of said members having an elongated contact surface which faces an elongated contact surface of the other member, the contact surface of at least one of said members including a generally planar strip having a raised electrically conductive rib extending along its length and protruding from said strip toward the elongated contact surface of the other member, said contact surfaces being normally electrically isolated from one another when said members are closely spaced from one another, said raised electrically conductive rib on the at least one member and the contact surface on the other member moving into electrical contact with each other upon deformation of at least one of said first and second members.

3. A crush sensor according to claim 2 further comprising first mounting means for mounting said members to the vehicle door.

4. A crush sensor according to claim 3 wherein said first mounting means includes means disposed only at opposite ends of said members and for fixedly mounting said members to the vehicle door.

5. A crush sensor according to claim 3 further comprising second mounting means for mounting said first and second members relative to each other.

6. A crush sensor according to claim 5 wherein said second mounting means includes means disposed between said contact surfaces of said members along at least a portion of said members and for spacing said contact surfaces apart from each other when said contact surfaces are normally electrically isolated.

7. A crush sensor according to claim 5 wherein said second mounting means includes a number of insulated spacers spaced apart along at least a portion of said members and disposed between said contact surfaces of said members.

8. A crush sensor according to claim 2 wherein each of said members comprises electrically conductive metallic material.

9. A crush sensor according to claim 8 wherein said electrically conductive metallic material includes plated low carbon steel.

10. A crush sensor according to claim 2 wherein said contact surface of one of said members has a concave surface area, and said raised electrically conductive rib of said at least one of said members has a convex surface area which faces said concave surface area of said contact surface of said other member.

11. A crush sensor according to claim 2 wherein the length of each of said members is more than 50 percent of the length of the vehicle door in the forward and rearward directions of travel of the vehicle.

12. A crush sensor according to claim 11 wherein the length of each said members is approximately 85 percent of the length of the vehicle door in the forward and rearward directions of travel of the vehicle.

13. A crush sensor according to claim 2 further comprising an elongated plastic sleeve which acts as an environmental barrier and in which said members are disposed to prevent foreign objects from accidently shorting said members.

* * * * *